INVENTORS
FRANKLIN H. GREB
DAVID L. HANSBROUGH
DAVID J. YOUNG

ATTORNEY

INVENTORS
FRANKLIN H. GREB
DAVID L. HANSBROUGH
DAVID J. YOUNG
BY

ATTORNEY

Jan. 13, 1970  F. H. GREB ET AL  3,489,294
LOAD LIMIT CONTROL FOR HOISTING EQUIPMENT
Filed April 25, 1968  7 Sheets-Sheet 3

INVENTORS
FRANKLIN H. GREB
DAVID L. HANSBROUGH
DAVID J. YOUNG
BY

Thomas W. Ehrmann

ATTORNEY

Jan. 13, 1970   F. H. GREB ET AL   3,489,294
LOAD LIMIT CONTROL FOR HOISTING EQUIPMENT
Filed April 25, 1968   7 Sheets-Sheet 4

INVENTORS
FRANKLIN H. GREB
DAVID L. HANSBROUGH
DAVID J. YOUNG
BY
*Thomas W. Ehrmann*
ATTORNEY Jan. 13, 1970   F. H. GREB ET AL   3,489,294
LOAD LIMIT CONTROL FOR HOISTING EQUIPMENT
Filed April 25, 1968   7 Sheets-Sheet 6

INVENTORS
FRANKLIN H. GREB
DAVID L. HANSBROUGH
DAVID J. YOUNG
BY
*Thomas W. Sherman*
ATTORNEY

United States Patent Office 3,489,294
Patented Jan. 13, 1970

3,489,294
LOAD LIMIT CONTROL FOR HOISTING EQUIPMENT
Franklin H. Greb, Waukesha, David Lee Hansbrough, South Milwaukee, and David J. Young, Milwaukee, Wis., assignors to Bucyrus-Erie Company, South Milwaukee, Wis., a corporation of Delaware
Filed Apr. 25, 1968, Ser. No. 724,180
Int. Cl. B66c *13/48, 23/06*
U.S. Cl. 212—39                                                   21 Claims

ABSTRACT OF THE DISCLOSURE

A load limit control is shown applied to a hydraulic crane having a revolving frame pivotally mounting the foot of a hydraulically extensible and retractable boom which is elevated and lowered by hydraulic hoist cylinders. A light cable is connected to the forward powered section of the boom and is wound about a stationary spring loaded cable drum which is geared to a boom length potentiometer. As the drum moves by the cable being pulled off when the boom is extended or by the spring winding the cable onto the drum as the boom is retracted, the potentiometer is driven and produces a signal that is proportional to boom length. A boom angle potentiometer is geared to the boom foot pin which rotates with the boom as the boom is raised and lowered and such potentiometer produces a signal that is proportional to boom angle. The two signals from the boom angle potentiometer and boom length potentiometer are combined in a summing circuit and the combined signal is fed to a servo-mechanism which drives a carrier having a path defining maximum allowable loads as indicated by the pressure in the hoist cylinders. A movable path tracer follows the path and the position of path tracer on the path represents a particular maximum allowable hoist cylinder pressure for the combination of boom angle and boom length. This particular hoist cylinder pressure is compared with actual hoist cylinder pressure. When the actual hoist cylinder pressure predominates, an unloading valve opens to connect hydraulic crane functions to tank.

BACKGROUND OF THE INVENTION

This invention relates to a load limit control for hoisting equipment, and more particularly to a load limit control which compares a maximum allowable load, as reflected by a combination of signals proportional to boom length and boom angle, with a signal proportional to the load on the boom.

It has long been recognized that overloading of hoisting equipment by operators is a major problem. The problem is particularly acute in mobile cranes where overloading can result in tipping over of the crane as well as permanent damage to structural components. While the conditions of stability and component strength will vary with different types and sizes of hoisting equipment, such conditions can be related to the factors of load lifted, boom elevation, and boom length for a particular type and size of equipment.

The load limit control of this invention is designed to relieve the problem of overloading as its relates to hoisting equipment having an extensible boom pivoted for rotation in a vertical plane. The load limit control functions to indicate when a lifted load or a load being lifted exceeds a maximum allowable load established for the combination of boom length and boom angle at which the boom is operating. The load limit control may operate when the maximum allowable load is reached to prevent the further hoisting of the load, the lowering or raising of the boom, or the extension of the boom, all factors which can aggravate the overloading. The operator is then required to perform a corrective action (such as lowering the load, retracting the boom or elevating the boom without raising the load) before all of the hoisting functions are again under the control of the operator. Alternately, the load limit control may operate to give a visual or audible warning to the operator when the maximum allowable load is reached.

The condition of the boom of a particular piece of hoisting equipment can be changed. For example, a manual point section can be either extended or retracted into the boom or a jib can be added to the boom. A change in the boom condition changes the basic length and reach of the boom. Accordingly, provision is made for the operator to adjust the load limit control of this invention to properly reflect the condition of the boom being used at a particular time.

SUMMARY OF THE INVENTION

This invention comprises a load limit control in combination with a hoisting apparatus having an extensible boom pivoted for rotation in a vertical plane with boom hoist means connected to elevate and lower said boom, said load limit control including means for sensing changes in length of the boom to produce a voltage signal proportional to the length of the boom, means for sensing the angle of the boom for producing a voltage signal proportional to the angle of the boom, a summing circuit to which such voltage signals are fed, positionable carrier means having a path defining maximum allowable loads, movable path tracing means adapted to follow the path, driving means responsive to the output of the summing circuit to move the carrier means to confront the path tracing means with a point on the path corresponding to the combination of voltage signals of boom angle and length, which point represents a maximuum allowable load, a source of a signal proportional to the load on the boom, and actuatable load limit means responsive to the path tracing means and to the signal proportional to the boom load, such load limit means being actuated when the boom load exceeds the maximum allowable load.

The invention also contemplates the provision of a plurality of carrier means each having a path defining maximum allowable loads for a different boom condition, whereby the operator can select the particular path for the condition of the boom that is being used at a particular time.

In the following description and accompanying drawings embodiments of the invention are disclosed in such full, clear and concise terms as to enable a person skilled in the art to make and use the invention. However, the embodiments disclosed represent only the best modes presently contemplated for carrying out the invention.

DESCRIPTION OF THE PREFERRED EMBODIMENTS

Figures 1, 2:
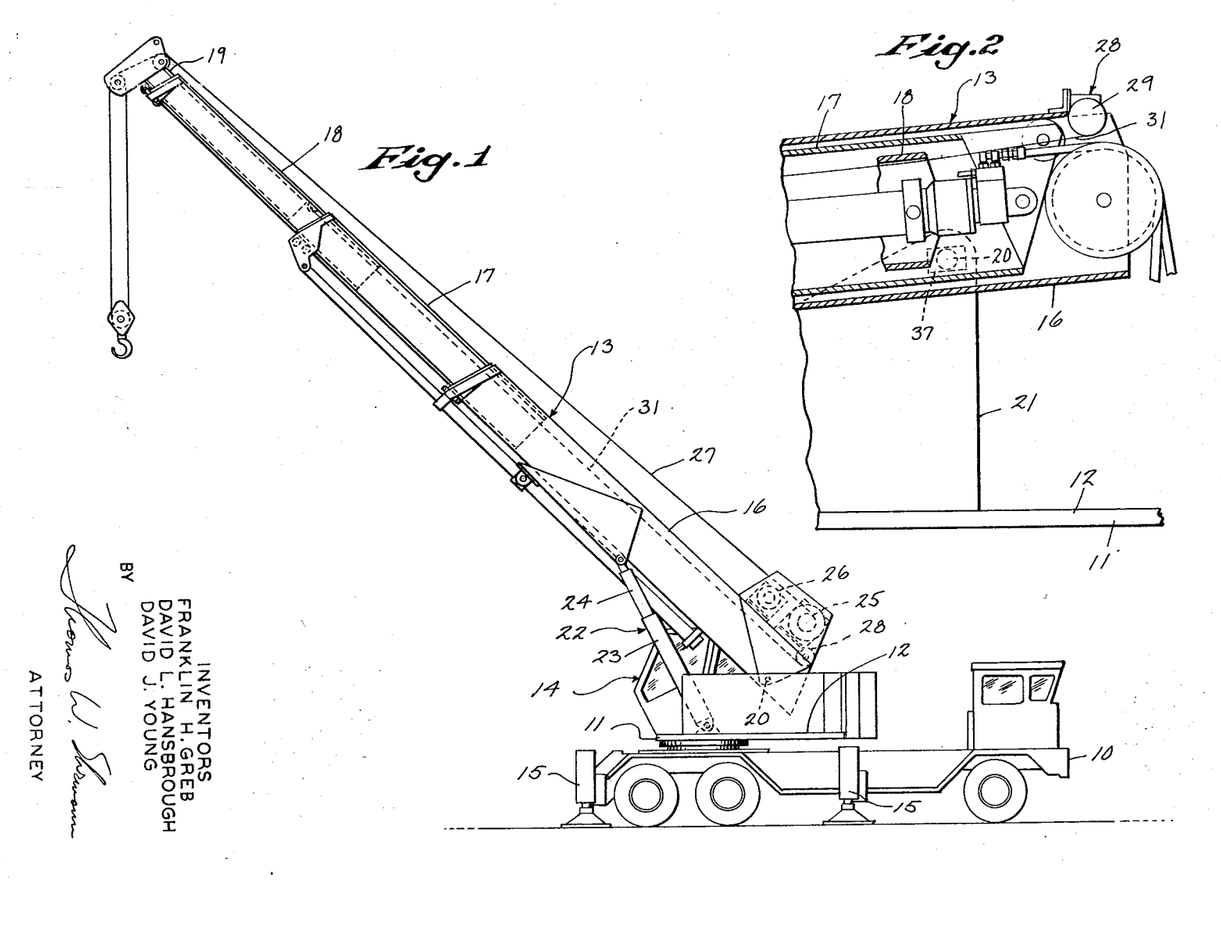
FIG. 1 is a view in side elevation of a mobile crane incorporating the invention.
FIG. 2 is a view in side elevation and partly in section of a portion of the foot section of the boom.

Referring to FIG. 1 the invention is shown incorporated in a hydraulic crane which includes a truck chassis 10 upon which is mounted a revolving frame 11. A deck 12 is supported on the revolving frame 11 and mounts a telescoping boom 13, a cab 14, and the mechanism for controlling the operation of the boom and the lowering and hoisting of loads. The truck chassis 10 is provided with extensible outriggers 15 which will stabilize the crane during hoisting operations.

The telescoping boom 13 may be of the type which is disclosed and described in the co-pending application of Lyle D. Grider, George W. Mork, and Gottfried Reuter for "Telescopic Cantilevered Boom," Ser. No. 618,254, filed Feb. 1, 1967, now Patent No. 3,445,004, and assigned to the assignee of this application. Suffice it to say for the purposes of this application that the boom 13 includes a foot section 16, a first intermediate section 17 telescopically received in the foot section 16, a second intermediate section 18 telescopically received in the first intermediate section 17, and a point section 19 telescopically received in the second intermediate section 18.

As is known, the first intermediate section 17 is extended and retracted relative to the foot section 16 by a hydraulic telescopic cylinder, and the second intermediate section 18 is extended and retracted relative to the first intermediate section 17 by a second hydraulic telescopic cylinder. The point section 19 is manually positioned within the second intermediate section 18 and is illustrated in FIG. 1 as being retracted. The telescopic cylinders are controlled so as to move the first and second intermediate sections in equal amounts as the boom is extended or retracted, whereby the movement of either the first or second intermediate boom section is directly proportional to the change in length of the boom.

The boom 13 is secured to the deck 12 by pivotally attaching the bottom of the foot section 16 by means of boom foot pins 20 which are journaled in spaced standards 21 which rise from the deck 12. One of the standards 21 is shown in FIG. 2. A pair of hydraulic boom hoist cylinders 22, only one of which may be seen in FIG. 1, each have their cylinder casings 23 pivotally connected to the deck 12 and have their piston rods 24 pivotally connected to the foot section 16 of the boom forward of the pivot of the boom. Hydraulically driven primary and secondary hoist cable drums 25 and 26, respectively, are mounted on the top of the foot section 16 and a hoist cable 27 extends from the primary hoist cable drum 25 over boom point sheaves on the end of the point section 19 to mount a hook or any other hoisting tool.

Figure 4:
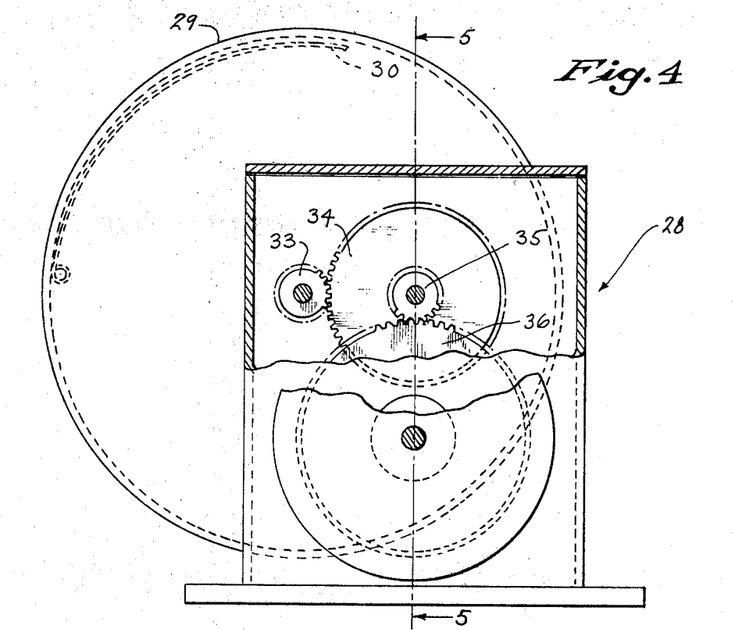
FIG. 4 is an end view in elevation of the boom length sensing unit.
Figure 5:
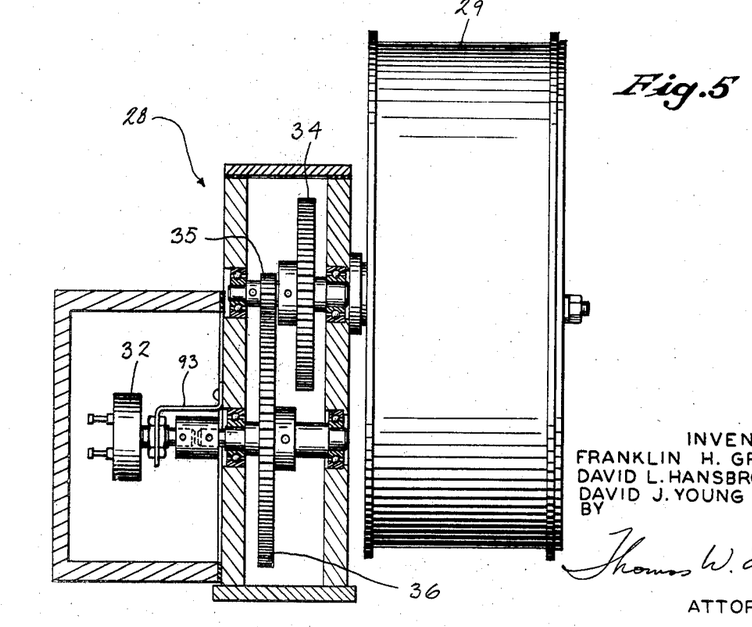
FIG. 5 is a view in vertical section taken in the plane of the line 5—5 of FIG. 4.

A voltage proportional to the length of the telescoping boom 13 is produced by a boom length sensing unit indicated generally by the reference numeral 28 (see FIGS. 2, 4 and 5) mounted near the top of the boom. Such sensing unit includes a cable drum 29 that has an internal spiral power spring 30. One end of light cable 31 (FIG. 2) is anchored to the periphery of the drum 29 and the other end of the cable 31 is secured to a point on the second intermediate boom section 18. When the boom 13 is extended, the drum is turned in one direction by the boom pulling out the cable 31. When the boom is retracted, the wound spring 30 will turn the drum in the opposite direction. Rotation of the drum 29 is transmitted to a boom length potentiometer 32 through double reduction gearing. The gearing consists of a pinion 33 on the drum shaft which meshes with a gear 34 on an intermediate shaft that includes a second pinion 35 which in turn meshes with a second gear 36 on a shaft connected to the potentiometer 32. The potentiometer 32 is held against rotation on a bracket 93 secured to the housing of the unit 28.

The boom length potentiometer 32 is connected to the drum 29 in such manner that the minimum voltage signal from such potentiometer 32 will be produced when the boom is fully retracted. Thus, as the drum 29 is rotated in a counterclockwise direction as viewed in FIG. 4 when the boom is extended, the boom length potentiometer will be driven and will produce a greater voltage signal. The change in voltage signal from the potentiometer 32 is always proportional to the change in length of the boom 13.

Figures 3, 11:
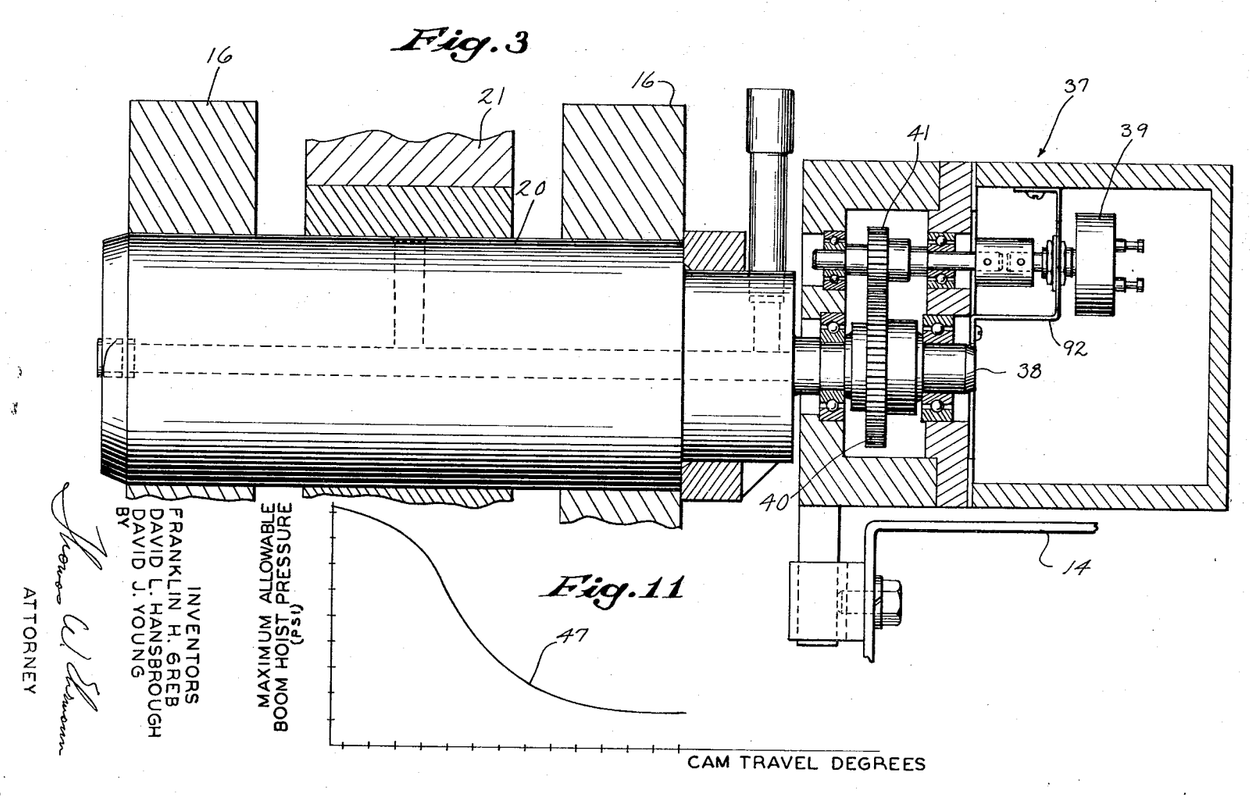
FIG. 3 is a view in vertical section through the boom angle sensing unit connected to a boom foot pin.
FIG. 11 is a curve of the development of the cam surface for the load limit cam for one boom condition.

A voltage proportional to the angle of the boom 13 is produced by a boom angle sensing unit indicated generally by the reference numeral 37 (see FIGS. 2 and 3). The boom angle sensing unit 37 is mounted on a stationary base, such as the cab 14, and is driven by one of the boom foot pins 20 which is anchored to the foot section 16 and rotates within a standard 21. A shaft portion 38 extends from the pin 20 and is connected to a boom angle potentiometer 39 through single step-up gearing comprising a gear 40 on the shaft 38 which meshes with a pinion 41 on a shaft coupled to the potentiometer 39. The potentiometer 39 is held against rotation on a bracket 92 secured to the housing of the unit 37.

The boom angle potentiometer 39 is connected to the pin 20 in such manner that the maximum voltage signal from such potentiometer 39 will be produced when the boom is at its lowest elevation. Thus, when the pin 20 rotates as the boom 13 is elevated the boom angle potentiometer 39 will be driven in a direction to produce a smaller voltage signal until such signal is minimum at the maximum elevation of the boom. For the crane shown, the boom can be elevated through 75° of arc.

Figure 8:
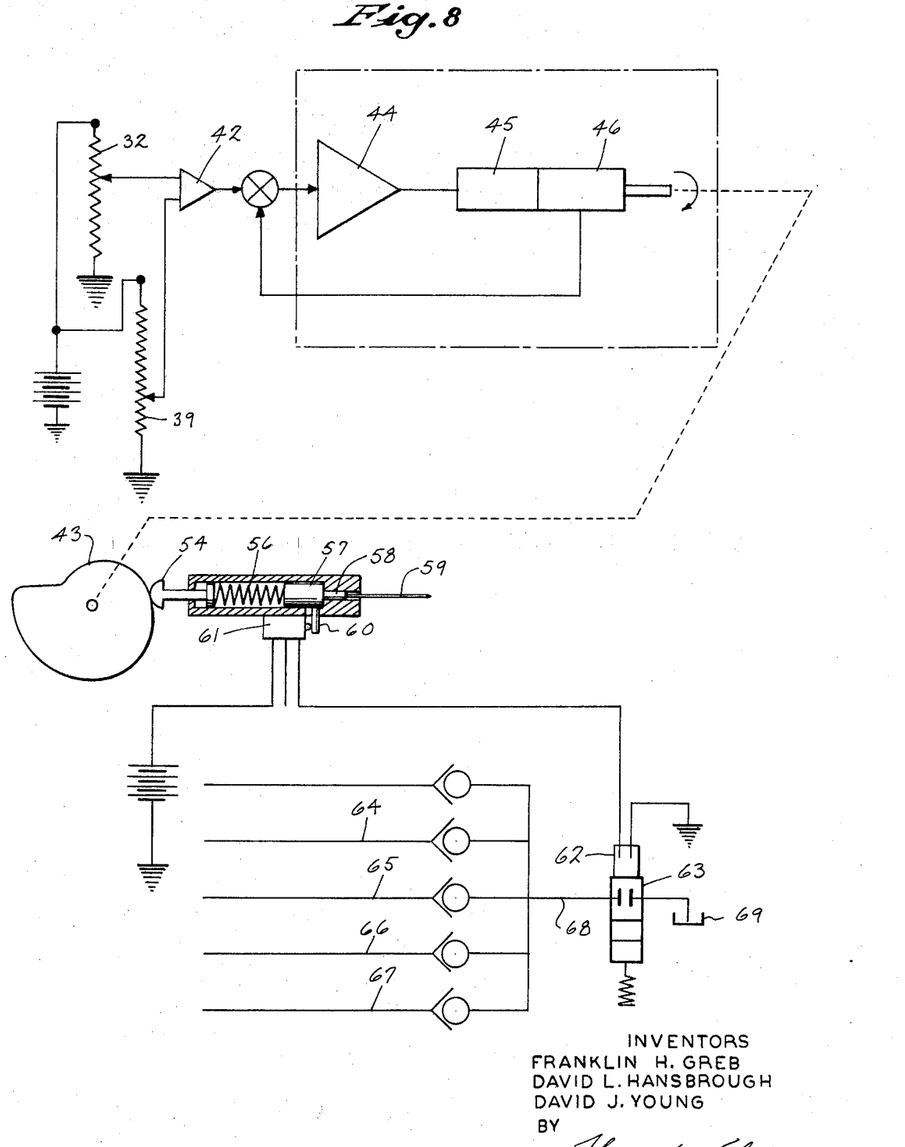
FIG. 8 is a diagrammatic view of a first embodiment of the load limit control.

Referring to FIG. 8, the boom length potentiometer 32 and the boom angle potentiometer 39 are both connected between a source of direct current and ground. The outputs of both potentiometers 32 and 39 are fed to a summing circuit 42 where the voltages are combined and the combined voltage signal drives positionable carrier means through a servo-mechanism. In the first embodiment, the carrier means comprises a load limit cam 43. The servo-mechanism includes an amplifier 44, a rotary actuator 45 and a feedback potentiometer 46 connected to the rotary actuator 45 to provide positive feedback of position voltage signals. The rotary actuator 45 drives a shaft which mounts the load limit cam 43. The angular position of the cam 43 is thereby made dependent upon the combination of the boom angle and the boom length.

The cam surface defines a path and is developed to represent the maximum safe load to be lifted at different combinations of boom length and boom angle. Since the pressure in the hoist cylinders 22 is directly proportional to the load on the boom 13, such boom hoist pressure is used as the measure of load on the boom 13. Thus, the cam surface or path represents maximum hoist cylinder pressure for safe loading and such maximum pressures change as the combination of boom angle and boom length change.

The development of the cam surface can be better appreciated by reference to FIG. 11 which is a plot of boom hoist pressure in p.s.i. (ordinate) against cam travel in degree (abscissa). The maximum safe load of the crane is governed by both the factor of stability against overturning and the factor of component strength, such as the strength of the boom. Under different combinations of boom angle and boom length one or the other of these two factors will govern. At each degree of cam travel, the maximum boom hoist pressure for safe load is calculated (taking into consideration stability and component strength) and plotted against the cam position. Since there are an infinite number of combinations of boom angle and boom length which could rotate the cam to a certain position, that combination is chosen which results in the lowest safe load, and thus the lowest boom hoist pressure. The curve 47 is therefore an envelope of the lowest boom hoist pressures for the total cam travel. The cam surface is a direct translation of the curve 47.

The gear ratios in the boom length sensing unit 28 and boom angle sensing unit 37 are selected by trial and error to produce a continuous curve 47 and thereby to produce a smooth cam surface.

Since the manual extension or retraction of the point section 19 will not be reflected in the boom length sensed by the sensing unit 28, the load limit cam 43 would be valid for only one boom condition. The illustrated load limit cam 43 represents the cam for the condition in which the point section 19 is retracted. Another cam, similarly developed, is required for the condition when the boom point section is extended. If a jib were added to the boom point, still another cam would be needed.

Figure 6:
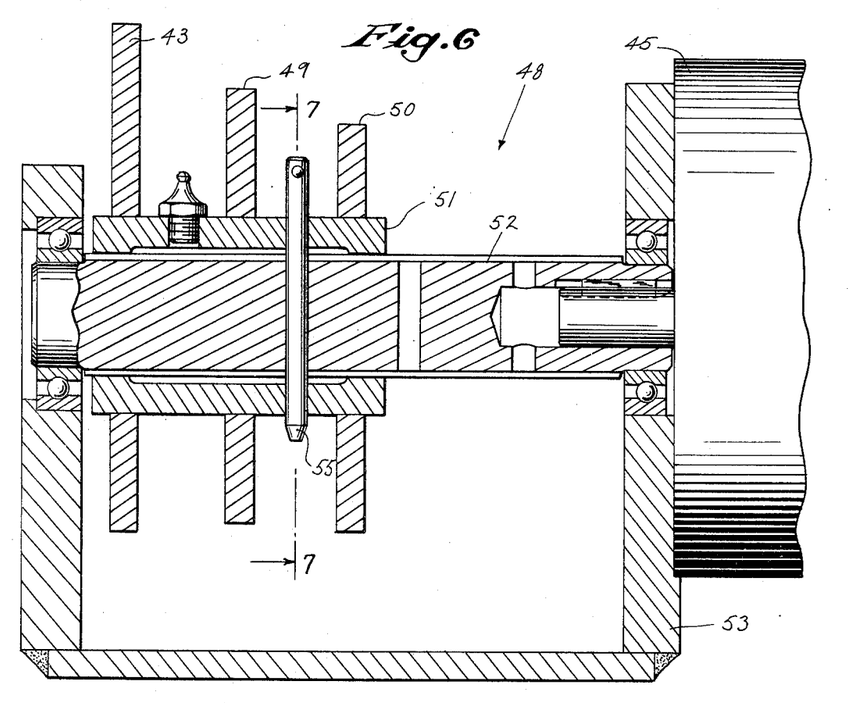
FIG. 6 is a view in side elevation and partly in section of a load limit cam unit.
Figure 7:
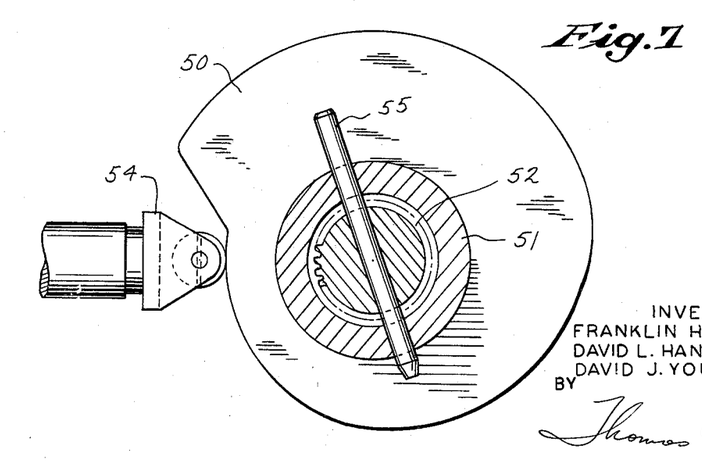
FIG. 7 is a view in vertical section taken in the plane of the line 7—7 of FIG. 6.

Referring to FIGS. 6 and 7, a load limit cam unit 48 includes three spaced cams 43, 49 and 50 welded integral with a hub 51 splined to the cam shaft 52 which is driven by the rotary actuator 45. The shaft 52 is journaled in a housing 53 to which the rotary actuator 45 is also secured. An axially movable cam follower 54 extends through the housing 53. The cam follower 54 follows the path defined by the cam surface. The cams 43, 49 and 50 respectively correspond to the following boom conditions: point section retracted without jib, point section extended without jib, and point section extended or retracted with jib. The crane operator selects the proper load limit cam depending upon the boom and jib that is being used and moves the selected cam in line with the cam follower 54. The hub 51 is locked in its selected position by a pin 55 which extends through openings in the hub 51 and a respective one of the three bores in the cam shaft 52.

In each of the first three illustrated embodiments, the rotation of the load limit cam 43 to a position proportional to the combination of boom angle and length presents to the cam follower a particular position on the cam surface which represents a maximum safe boom hoist pressure. This is compared with the actual boom hoist pressure and when the actual boom hoist pressure dominates, the flow of hydraulic fluid to all crane functions which would aggravate the unsafe condition will be directed to the reservoir. The operator must then perform some function that will reduce the boom hoist pressure, such as lowering the load or retracting the boom before all crane functions will again become operable.

In the embodiment of FIG. 8, the cam follower 54 changes the length of a spring 56 that is biased against one end of a spool 57. The other end of the spool is impinged upon by a piston 58 connected to a line 59 leading from the hoist cylinders 22. The spool 57 has a depending lug 60 and a normally closed switch 61 is in the path of the lug 60. The switch 61 is disposed in the connection of a solenoid 62 of an unloading valve 63. Hydraulic supply lines 64 through 67 each includes check valves and are commonly connected by a line 68 to a reservoir 69. Each of the supply lines is connected to the pressure line which will energize hydraulic motive means for a crane function. Specifically: the line 64 is connected to the pressure line for the hydraulic primary drum 25 to reel-in the hoist cable 27 to hosit a load; the line 65 is connected to the pressure line for energizing the hoist cylinders 22 to lower the boom; the line 66 is connected to the pressure line for energizing the boom cylinders to extend the boom 13; and the line 67 is connected to the pressure line for energizing the auxiliary drum 26 to reel-in cable. The unloading valve 63 is disposed in the line 68 and blocks such line so long as the switch 61 is closed to keep the solenoid 62 energized.

As the cam 43 rotates in a clockwise direction as viewed in FIG. 8 under an increasing combination of the signals of boom angle and length, the spring 56 will lengthen. The spring force at each position of the cam 43 is directly proportional to the maximum allowable boom hoist pressure. If the actual boom hoist pressure should be greater than the maximum allowable, it will push the piston 58 to the left to move the spool 57 and have the lug 60 trip the switch 61. This deenergizes the solenoid 62 and opens the unloading valve 63 and the flow of hydraulic fluid to all functions that would continue to overload the crane is directed to the reservoir 69. Once the operator performs some function to reduce the boom hoist pressure below the maximum allowable, the spring 56 will return the spool 57 to its original position and the unloading valve 63 is closed so that all crane functions again become operable.

Figure 9:
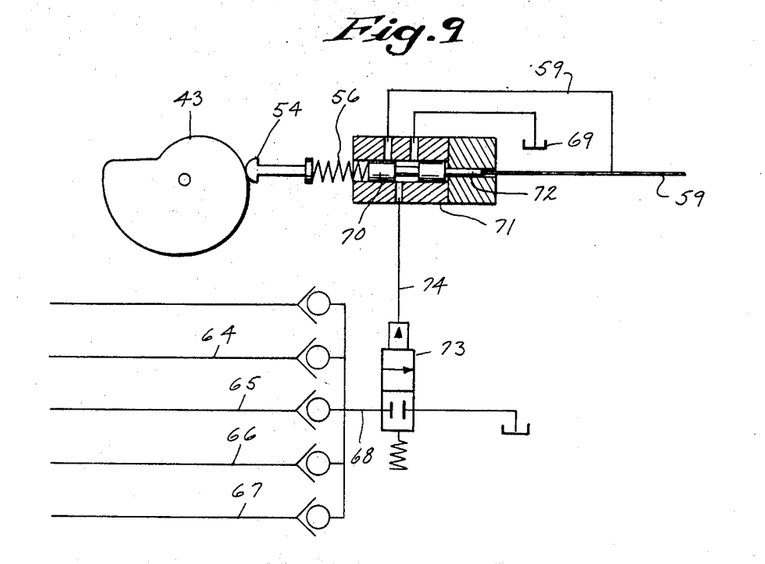
FIG. 9 is a diagrammatic view of a second embodiment of the load limit control.

The embodiment of FIG. 9 is similar to the first described embodiment of the load limit control. It differs in that the spring 56 biases against the spool 70 of a piloting valve 71. The spool is also acted upon by a piston 72 connected to the boom hoist pressure by a line 59. A hydraulically piloted unloading valve 73 normally blocks the line 68. In the normal position, a pilot line 74 from the valve 71 to the unloading valve 73 is open to the reservoir. However, when the actual boom hoist pressure exceeds the maximum allowable boom hoist pressure, the spool 70 is shifted to the left by the piston 72 thereby closing the valve port to the reservoir 69 and connecting fluid under pressure from the line 59 to the piloted unloading valve 73 to open the same.

Figure 10A:
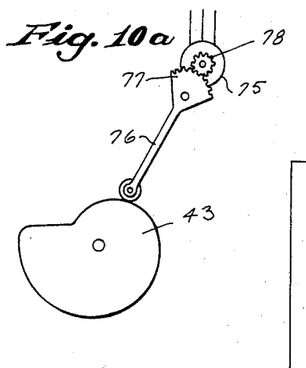
FIGS. 10a and 10b are diagrammatic views of a third embodiment of the load limit control.
Figure 10B:
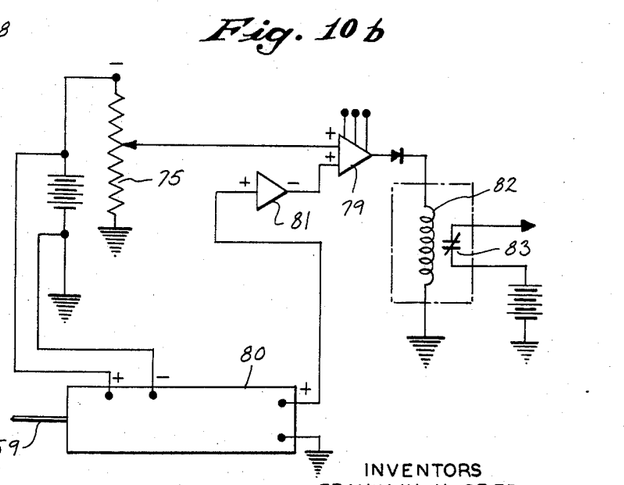

In the third embodiment shown in FIGS. 10a and 10b, the load limit cam 43 drives a readout potentiometer 75 by means of a pivotable cam follower 76 having a sector gear 77 formed at one end that meshes with a gear 78 on the shaft of the potentiometer 75. The voltage output signal of the potentiometer is fed to a summing circuit 79. A pressure transducer cell 80 is connected to the line 59 leading from the boom hoist cylinders 22. The pressure transducer cell 80 produces a voltage signal that is directly proportional to the boom hoist pressure and such voltage signal is fed through an inverter 81 to the summing circuit 79.

The output signal from the summing circuit 79 is connected through a diode to the coil 82 of a sensitive relay having normally closed contacts 83 which maintain the solenoid 62 of the unloading valve 63 energized, as in the first embodiment. As long as the signal from the readout potentiometer 75 is greater than the signal from the transducer cell 80 (but of opposite polarity), the relay will stay closed. However, when the actual boom hoist pressure exceeds the maximum allowable pressure, the signal from the transducer cell 80 will exceed the signal from the readout potentiometer and the relay coil will be deenergized. This will open the relay contacts 83, deenergize the solenoid 62 and open the unloading valve 63. While an electro-mechanical relay is illustrated, a semi-conductor switch could alternately be used.

Figure 12:
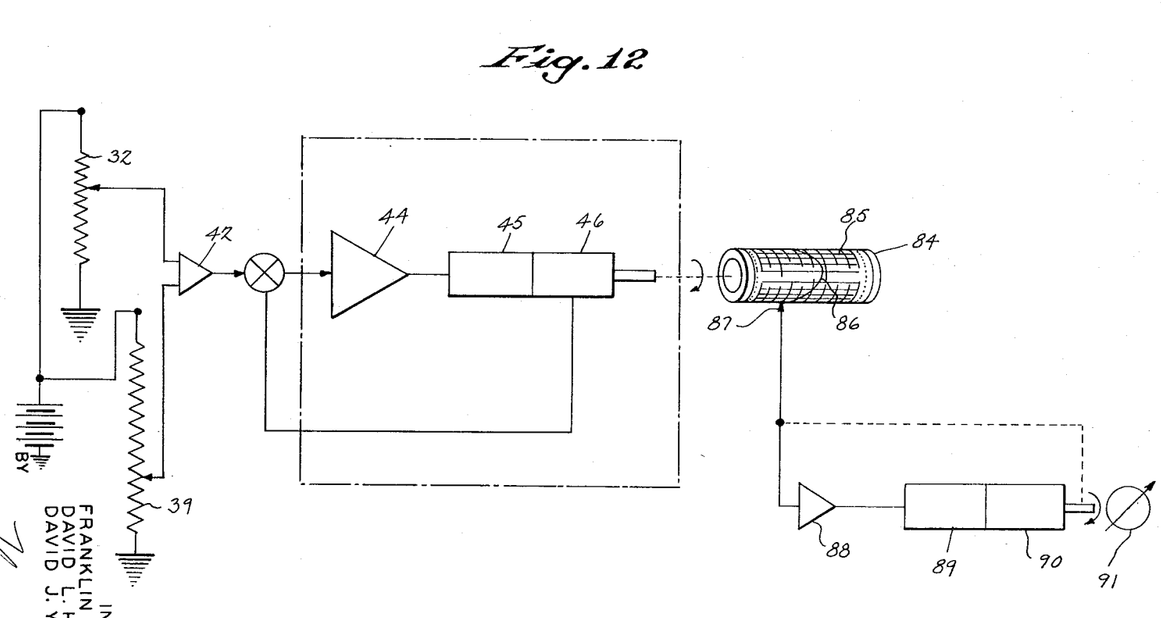
FIG. 12 is a diagrammatic view of a fourth embodiment of the load limit control.

The embodiments heretofore described utilize a load limit cam as a carrier means for a path which is defined by the cam surface and a cam follower being utilized as a path tracing means. Alternate forms of carrier means and path tracing means are employed in the fourth embodiment. Referring to FIG. 12, the shaft which is driven by the servo-mechanism that is controlled by the combination of voltage signals of boom angle and boom length is connected to a rotatable drum 84. A chart 85 having a metalized surface on a non-conductive base is wrapped around the periphery of the drum 84. A path 86 is scribed on the surface of the chart 85 to remove the metalized surface and thereby define a path of non-conductive material. The path 86 corresponds to the curve 47 when the curve 47 is plotted against degrees of rotation of the drum as the abscissa rather than degrees of cam rotation or travel. Thus, the path 86 described on the chart 85 represents maximum allowable boom hoist pressures at various combinations of boom length and boom angle.

Path tracing means in the form of an electrically conductive probe 87 which is driven by a probe servo-mechanism including an amplifier 88, an actuator 89 and a feedback device 90. The probe 87 is driven laterally along the surface of the chart 85 and signals to drive the actuator 89 are produced by electrical contact between the probe and the metalized surface of the chart on one or the other side of the path 86. A signal of one polarity to drive the probe in one direction toward the path 86 is produced by contact between the probe 87 and the chart 85 on one side of the path 86. Conversely, contact between the probe 87 and chart 85 to the other side of the path 86 will produce a signal of opposite polarity to move the probe 87 toward the path 86 from the opposite direction. Thus, the probe 87 seeks and follows the path 86. In driving the probe 87 to follow the path 86, the probe servo-mechanism also drives a readout potentiometer 91.

Thus, the drum 84 and chart 85 are rotated to a position depending upon the combination of the voltage signals proportional to boom angle and boom length. The probe 87 follows the path 86 and its position as reflected in the position of the readout potentiometer produces a voltage signal proportional to maximum allowable load. This signal is used in the same manner as the signal from the readout potentiometer 75 previously described in the third embodiment of FIG. 10b.

A programmer including the drum, probe, and probe servo-mechanism is commercially available and is sold by Research Incorporated, Minneapolis, Minnesota under the trademark "Data-Trak." A non-contact version of such a programmer using an electronic probe which senses capacitances to control the actuator 89 is also available under the name "Stata-Trak."

While the load limit control has been described in relation to a telescoping cantilever boom supported by hydraulic hoist cylinders, it can also be used in combination with a conventional cable suspended boom. In such a usage, the load on the boom would be sensed by measuring the boom hoist cable tension rather than boom hoist pressure. The boom hoist cable tension could be sensed by a transducer which would produce a hydraulic fluid pressure signal directly proportional to the load on the boom and thus be used in a manner similar to the boom hoist pressure signal of the first and second embodiments. Alternatively, the hoist cable tension could be converted by a tarnsducer into a voltage signal which would be used as in the third and fourth embodiments.

Likewise, the load limit control could be used on hoist equipment having electrical drives for its functions rather than hydraulic drives. This would be accomplished by adapting either of the first, third or fourth embodiments to controlling a relay, rather than an unloading valve. The relay would be actuated to halt the previously described crane functions when the actual load on the boom exceeds the maximum allowable loads reflected by load limit cam position.

Finally, the load limit control has been described in realtion to controlling crane functions. The load limit control may, however, be adapted to give a visual warning (e.g. lighted bulb) or an audible warning (e.g. a ringing bell) to the operator when maximum allowable load is reached. This would be accomplished by having the switch 61 of the first embodiment complete a circuit to either a visual of audible warning device to actuate the same. Likewise, the relay contacts 83 of the third embodiments could be applied to the same purpose.

What we claim is:

1. In combination with a hoisting apparatus having an extensible boom pivoted for rotation in a vertical plane, and boom hoist means connected to elevate and lower said boom, a load limit control comprising:

boom length sensing means responsive to changes in the length of said boom and adapted to produce a voltage signal proportional to the change in the length of said boom;

boom angle sensing means responsive to changes in the elevation of said boom and adapted to produce a voltage signal proportional to the change in the angle of said boom;

a summing circuit connected to receive said voltage signals and producing an output voltage that is the algebraic sum of said voltagt signals;

positionable carrier means having a path defining maximum allowable boom loads;

movable path tracing means adapted to follow said path;

driving means responsive to the output voltage of said summing circuit to position said carrier means in accordance with the combination of said voltage signals of boom length and boom angle, whereby said path tracing means confronts a point on said path that represents a particular maximum allowable boom load;

a source of a signal proportional to the load on said boom; and actuatable load limit means responsive to said path tracing means and said boom load signal, said load limit means being actuated when the boom load signal is greater than said particular maximum allowable boom load.

2. The load limit control of claim 1 wherein said driving means comprises a servo-mechanism including position feedback means.

3. The load limit control of claim 2 wherein said carrier means is a load limit cam driven by said servo-mechanism, said path is defined by a cam surface of said cam, and said path tracing means comprises a cam follower which rides on said cam surface.

4. The load limit control of claim 3 wherein there is a plurality of load limit cams each of which has its cam surface providing a path defining maximum allowable boom loads for a particular condition of said boom, together with means for presenting any one of said cams to said cam follower.

5. The load limit control of claim 4 wherein said cams are mounted in spaced relation on a hub, a cam shaft is driven by said driving means, said hub is mounted on said cam shaft to rotate with said shaft and for axial movement on said shaft, said cam follower is disposed at a fixed axial position relative to said shaft, and releasable locking means are provided to hold said hub at a selected position on said shaft to present a selected one of said cams to said cam follower.

6. The load limit control of claim 2 wherein said carrier means comprises a rotatable cylinder having an electrically conductive chart secured about the periphery of said drum, and said path is defined by a non-conductive line described on said chart, and wherein said path tracing means comprises an electrically conductive probe riding on said chart and means responsive to the contact of said probe with said conductive chart to maintain said probe in contact with said non-conductive path.

7. The combination of claim 1 wherein said hoisting apparatus includes controlled power means for hoisting loads on said boom and for extending said boom, and wherein said load limit means is adapted when actuated to prevent the operation of said boom hoist means to move said boom and to prevent the operation of said controlled power means.

8. In combination with a hoisting apparatus having an extensible boom pivoted for rotation in a vertical plane, and a hydraulic boom hoist cylinder connected to said boom and operable to elevate and lower said boom, a load limit control comprising:

boom length sensing means responsive to changes in the length of said boom and adapted to produce a voltage signal proportional to the change in the length of said boom;

boom angle sensing means responsive to changes in the elevation of said boom and adapted to produce a voltage signal proportional to the change in the angle of said boom;

a summing circuit connected to receive said voltage signals and producing an output voltage that is the algebraic sum of said voltage signals;

positionable carrier means having a path defining maximum allowable boom hoist cylinder pressures which are directly proportional to maximum allowable loads on said boom;

movable path tracing means adapted to follow said path;

driving means responsive to the output voltage of said summing circuit to position said carrier means in accordance with the combination of said voltage signals of boom length and boom angle, whereby said path tracing means confronts a point on said path that represents a particular maximum allowable boom hoist cylinder pressure; and actuatable load limit means responsive to said path tracing means and the fluid pressure in said boom hoist cylinder, said load limit means being actuated when the pressure in said boom hoist cylinder exceeds said particular maximum allowable boom hoist cylinder pressure.

9. A load limit control in accordance with claim 8 wherein said carrier means is rotatably positionable and wherein said driving means comprises a servo-mechanism including a rotary actuator connected to a shaft which mounts said carrier means and a feedback potentiometer connected to said shaft and adapted to produce a feedback voltage signal to said rotary actuator.

10. A load limit control in accordance with claim 8 wherein said boom length sensing means includes a variable boom length potentiometer and means connecting said boom length potentiometer to said boom to vary said potentiometer in accordance with changes in the length of said boom.

11. A load limit control in accordance with claim 10 wherein said means connecting said boom length potentiometer to said boom comprises a rotatable spring loaded cable drum at the foot of said boom, gearing connecting said drum to said boom length potentiometer, and a cable anchored at one end to the periphery of said drum and at the other end to the forwardmost powered section of said boom that is extensible relative to the foot of said boom.

12. The combination in accordance with claim 8 wherein said boom angle sensing means includes a variable boom angle potentiometer and means connecting said boom angle potentiometer to said boom to vary said potentiometer in accordance with changes in the angle of elevation of said boom.

13. The combination in accordance with claim 12 wherein said boom mounts a boom foot pin that is journaled in a support, said boom angle potentiometer is mounted stationary relative to said boom, and wherein said means connecting said boom angle potentiometer to said boom comprises gearing connecting said boom foot pin to said potentiometer.

14. The combination of claim 9 wherein said hoisting apparatus includes hydraulic motive means for extending and retracting said boom, a hydraulically driven drum for a hoist cable operating on said boom, and a hydraulic control system for controlling the operation of said hoist cylinder, said motive means and said drum, and wherein said actuatable load limit means includes a normally closed unloading valve adapted when actuated to open to vent said control system to prevent the lowering of said boom, the reeling in of said hoist cable by said drum, and the extending of said boom.

15. The combination in accordance with claim 14 wherein said carrier means is a load limit cam mounted on said shaft, said path is defined by a cam surface of said cam, and said path tracing means comprises a cam follower which rides on said cam surface.

16. The combination of claim 15 wherein said actuatable load limit means further includes a shiftable spool, a spring biased between said cam follower and one end of said spool, and a piston connected to the pressure in said boom hoist cylinder and bearing upon the other end of said cylinder, whereby shifting of said spool by boom hoist cylinder pressure in excess of said particular maximum allowable boom hoist cylinder pressure will actuate said unloading valve.

17. The combination of claim 16 wherein said unloading valve is solenoid controlled and where in a switch is actuated by said spool when the same is shifted by excessive boom hoist cylinder pressure to actuate the solenoid and open said unloading valve.

18. The combination of claim 16 wherein said unloading valve is hydraulically piloted and wherein said spool when shifted by excessive boom hoist cylinder pressure directs hydraulic fluid under pressure to pilot said unloading valve and open the same.

19. The combination of claim 14 wherein said unloading valve is solenoid controlled, and wherein said actuatable load limit means comprises a variable readout potentiometer responsive to movement of said path tracing means and adapted to produce a voltage signal proportional to said particular maximum allowable boom hoist cylinder pressure, a pressure transducer connected to said boom hoist cylinder and adapted to produce a voltage signal proportional to actual boom hoist cylinder pressure, an inverter to which the voltage signal from said transducer is fed, a summing circuit connected to receive the voltage signals from said readout potentiometer and said inverter and adapted to produce an output voltage that is the algebraic sum of said signals, a relay controlled by the output of said summing circuit, and adapted when actuated to actuate the solenoid of said unloading valve to open the same, said relay being actuated when the signal proportional to actual boom hoist cylinder pressure exceeds the signal proportional to said particular maximum allowable boom hoist cylinder pressure.

20. The combination in accordance with claim 19 wherein said carrier means is a load limit cam mounted on said shaft driven by said servo-mechanism, said path is defined by a cam surface on said cam, and said path tracing means comprises a cam follower pivoted intermediate of its ends, one end of said cam follower riding on said cam surface and the opposite end of said cam follower being geared to said readout potentiometer.

21. The combination in accordance with claim 19 wherein said carrier means comprises a rotatable cylinder mounted on said shaft driven by said servo-mechanism and having an electrically conductive chart secured about the periphery of said drum, said path is defined by a non-conductive line described on said chart, and wherein said path tracing means comprises an electrically conductive probe riding on said chart and servo-mechanism means responsive to the contact of said probe with said conductive chart to maintain said probe in contact with said non-conductive path, said probe being connected to said readout potentiometer to vary the same as said probe moves.

References Cited

UNITED STATES PATENTS 2,936,847  5/1960  Eitel _______________ 212—39

HARVEY C. HORNSBY, Primary Examiner

U.S. Cl. X.R.

212—55